Sept. 4, 1951 P. J. CHRISTOFOLI ET AL 2,566,315
AXIALLY COLLAPSING TYPE, HYDRAULICALLY OPERATED
TIRE BEAD BREAKING MACHINE
Filed Aug. 21, 1946 3 Sheets-Sheet 1
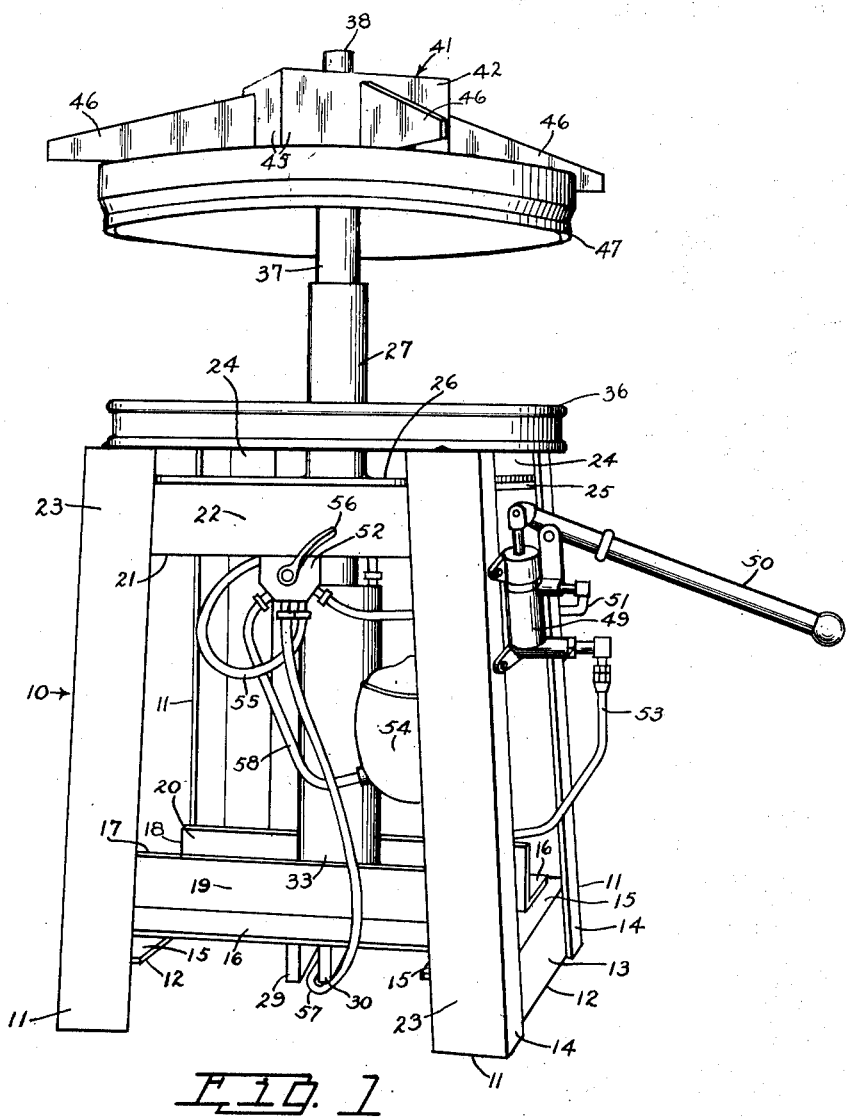
Inventor
PIETRO J. CHRISTOFOLI
WILBURN O. BENNETT
By
Attorney

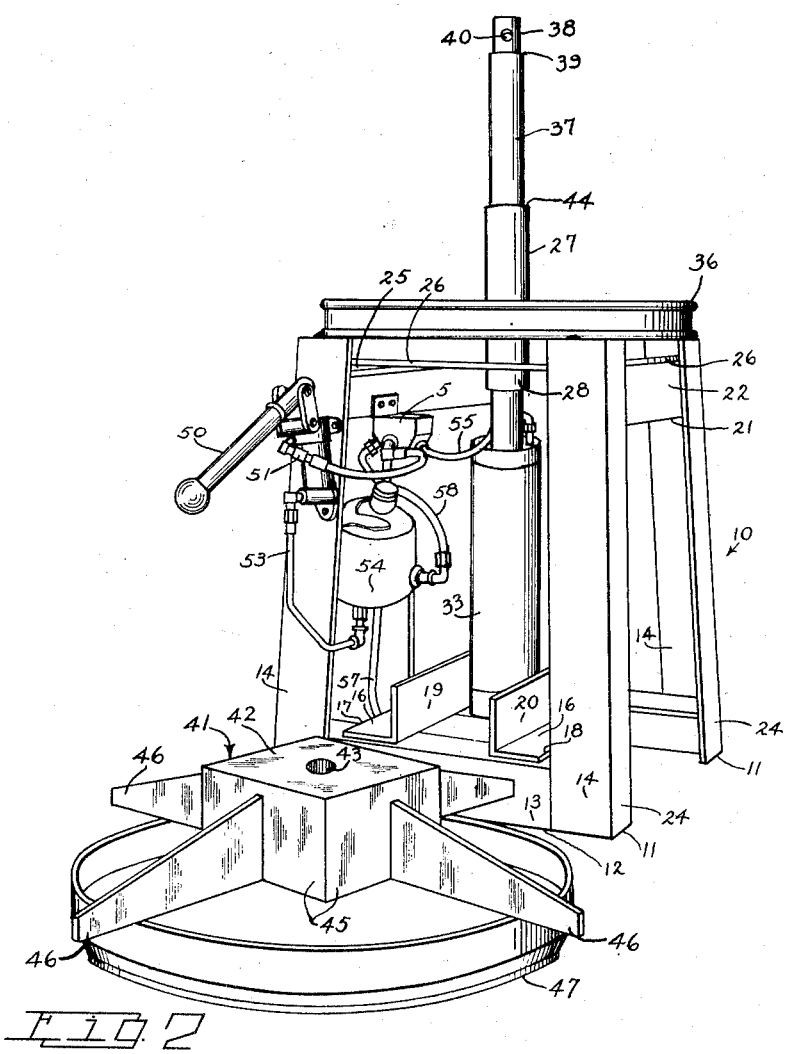
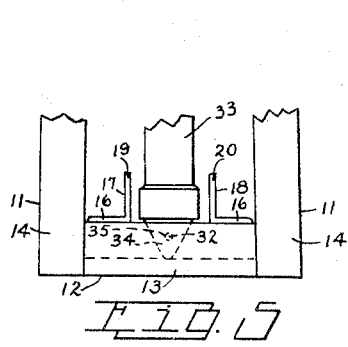
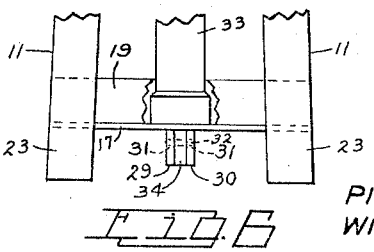

Sept. 4, 1951     P. J. CHRISTOFOLI ET AL     2,566,315
AXIALLY COLLAPSING TYPE, HYDRAULICALLY OPERATED
TIRE BEAD BREAKING MACHINE
Filed Aug. 21, 1946     3 Sheets-Sheet 3
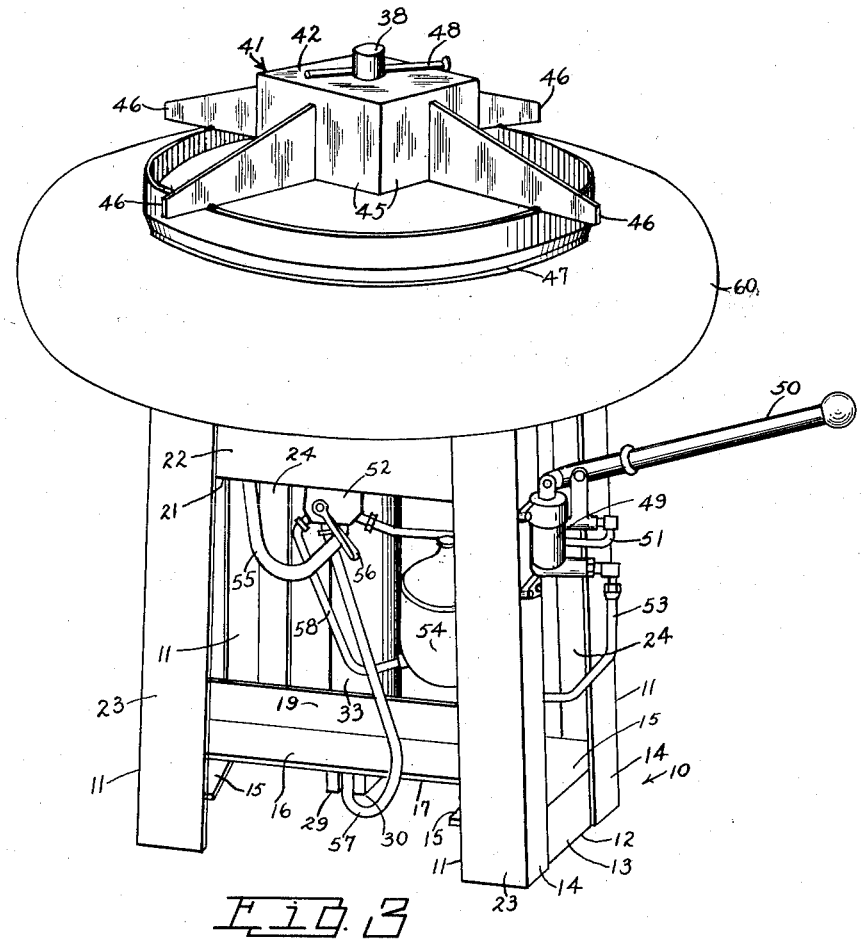
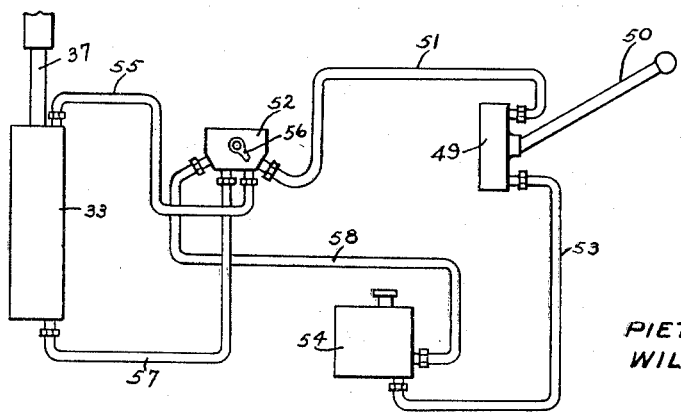
Inventor
PIETRO J. CHRISTOFOLI
WILBURN O. BENNETT Patented Sept. 4, 1951

2,566,315

UNITED STATES PATENT OFFICE 2,566,315

AXIALLY COLLAPSING TYPE, HYDRAULI-
CALLY OPERATED TIRE BEAD BREAKING
MACHINE

Pietro J. Christofoli, United States Navy, and
Wilburn O. Bennett, Roscoe, Tex.

Application August 21, 1946, Serial No. 691,889

1 Claim. (Cl. 157—1.2)

(Granted under the act of March 3, 1883, as
amended April 30, 1928; 370 O. G. 757)

The present invention relates to axially collapsing type, hydraulically operated tire bead breaking machines.

It is an object of the present invention to provide means for breaking the bead of a tire away from the rim of a wheel.

Another object of the present invention is the provision of hydraulic means for disengaging the bead of a tire from the rim of a wheel.

Still another object of the invention is to provide tire bead breaking means which is adaptable to tires of different diameters.

Other objects and advantages of the present invention will be better understood during the course of the following detailed description when taken in connection with the accompanying drawings forming a part of the specification, and in which drawings:

Figure 1 is an elevational view of the device illustrating the bead breaker in an inoperative position.

Figure 2 is an elevational view of the device viewed from a different angle, the bead breaker being removed from the piston rod.

Figure 3 is an elevational view similar to Figure 1 and illustrating a tire in position for the bead breaking operation.

Figure 4 is a schematic view of the hydraulic mechanism.

Figs. 5 and 6 are detail views in side elevation of the lower portion of the framework.

In the drawings the numeral 10 represents a stand, the elements comprising same being of angle iron that form a very sturdy and substantial structure, however we do not wish to confine ourselves to angle iron as other suitable material may be used. The legs 11 of the stand are disposed at an angle toward their top ends, the square area of the stand at the base being greater than at the top. On the opposed sides of the frame at the base of the legs 11 are transverse angle irons 12 having one flange 13 connected by any suitable means to the side flanges 14 of the legs 11, the other flange 15 of the angle irons 12 being disposed inwardly. Superposed upon the transverse flanges 15 and secured thereto, are flanges 16 of angle irons 17 and 18, the flanges 19 and 20 being face to face and in spaced relation. The front and back sections of the stand adjacent the top are provided with angle irons 21, one face 22 being secured to the flanges 23 and 24 of legs 11, the opposite flange 25 of the angle irons 21 being disposed inwardly of the frame and forming a base upon which is superposed a disc 26 having a tubular shank 27 extending upwardly from the upper surface of the disc and a shorter shank 28 extending downwardly from the under side surface of the disc, the disc being below the top ends of the legs 11.

Secured to the flanges 16 on the under side are transverse strap irons 29 and 30 that are in spaced relation and midway the ends of each strap is an aperture 31 that receives a pin 32. Centrally of the frame 11 there is mounted a hydraulic cylinder 33 having a tongue 34 that is interposed between the straps 29 and 30. The base of the cylinder 33 rests on the straps 29 and 30, the tongue 34 having an aperture 35, the tongue being secured to the straps 29 and 30 by the pin 32 passing through apertures 31 and 35. Superposed upon the top ends of the legs 11 and secured thereto by any suitable means such as by spot welding, is a bead ring 36. The cylinder 33 is provided with a piston rod 37 that passes through the tubular shanks 27 and 28, the upper end portion 38 of the piston rod being of a reduced diameter and having a flange 39, and a bore 40.

Superposed upon the piston rod 37 is a bead breaker 41 that comprises a bridle having a block 42 that may be of solid material or of plate construction. If the block is of solid construction it is provided with a bore (not shown) slightly larger than the diameter of the piston rod 37, and a reduced bore 43 that is slightly larger than the diameter of the reduced end portion 38 of the piston rod 37. If a plate assembly is used in place of the block 42, the bottom plate would be provided with a bore to permit the piston rod 37 to pass through, and the top plate with a reduced bore to permit the reduced portion 38 of the piston rod to pass through. By providing bores in the block or plates, a structure is provided that permits the base of block 42 or the base of the bottom plate to rest on the top 44 of shank 27, the base of the reduced bore 43 engaging the flange 39. Emanating from or secured to the side walls 45 of the block 42 or plates, are arms 46, the bottom edges of the arms 46 intermediate the arm ends being secured by any suitable means to the top edge of a bead breaking ring 47. The bead breaker 41 is secured to the piston rod 37 by a pin 48 that is secured in the bore 40.

Mounted on the frame 10 is a pump 49 having a handle 50, a conduit 51 that connects one side of the pump to one terminal of a selective rotatable reversing valve 52, the valve being secured to the frame 10. Conduit 53 connects one side of the pump 49 to a fluid tank 54 that is secured to the frame, and conduit 55 connects one terminal of the valve 52 to the hydraulic cylinder 33. Fluid under pressure will pass from tank 54 through conduits 53 and 51, through valve 52 and conduit 55 to the hydraulic cylinder when the valve lever 56 is in the down position as shown in Figure 3.

Conduit 57 connects the hydraulic cylinder 33 to one side of the selective valve 52 and conduit 58 connecting one side of the valve to the tank 54, these elements being brought into operation when the lever 56 is in the up position as shown in Figure 1.

In the operation of the device to break the bead of tire 60 away from the rim of a wheel, the tire wheel assembly is placed on the stand 10 and the tire 60 adjusted to the bead ring 36. The bead breaker 41 is then positioned on the piston shaft 37 and the pin 48 inserted in the bore 40. At this point the lever is turned to the down position as shown in Figures 3 and 4. The hydraulic pump 49 is then operated by pumping the handle 50 up and down. This pumping action causes fluid in the fluid tank 54 to pass through conduit 53 through the pump 49, through conduit 51, through the rotatable reversing valve 52, into conduit 55 and finally into the hydraulic cylinder 33, the fluid forcing the piston 38 down, thus drawing the bead breaker assembly down, the bead breaker ring 47 being brought into engagement with the bead on the tire 60, and as the pumping action continues the ring 47 will force the tire first away from the top rim. As the downward movement continues, the arms 46 come in contact with the top rim of the wheel and, as the squeeze force continues, the pressure of the arms on the wheel rim and top sides of the tire forces the lower bead of the tire away from the wheel, the wheel moving to the plate or disc 26.

The lever 56 is now turned to the up position as shown in Figure 1, conduit 57 becoming the inlet passage, the fluid traveling from tank 54 through conduit 53, through pump 49, through conduit 51, through the rotatable reversing valve 52 to the conduit 57, through conduit 57 to the hydraulic cylinder 33 forcing the piston in the cylinder upwardly, fluid being forced out of the cylinder into conduit 55, through the selective valve 52 to the conduit 58, through conduit 58 to the tank 54. During this operation the bead breaker assembly is moved upwardly and returned to the position shown in Figure 1.

Where the wheel rim has an inner diameter exceeding that of the bead ring 36 the tire bead may be removed by using a loose ring wider at the ring periphery than ring 47 and of such diameter as to surround ring 47 and be contacted by the projecting end sections of arms 46. In this manner the arms 46 make it possible to break beads from tires of larger diameters.

While certain forms of the invention have been shown for purposes of illustration, it is to be clearly understood that various changes in the details of the construction and arrangement of parts may be made without departing from the scope of the invention as set forth in the appending claim.

The invention described herein may be manufactured and used by or for the Government of the United States of America for governmental purposes without the payment of any royalties thereon or therefor.

What we claim is:

In a tire bead breaking machine, a stand comprising a framework having a top for supporting horizontally a wheel and beaded tire, a horizontally positioned ring fixed to the top of said stand for engaging the lower bead of a tire placed thereon, and movable means for engaging the top bead of said tire and said wheel, said movable means including a shaft positioned concentrically with reference to said fixed ring and extending vertically above and below said fixed ring, a power unit attached to said frame and shaft beneath said fixed ring for reciprocation of said shaft, and a spider attached to the top end of said shaft, said spider including a hub removably attached to said shaft end, radial arms extending outwardly from said hub all around the shaft, and a ring having the approximate dimensions of said fixed ring attached rigidly to said arms at points intermediate their lengths to form peripheral free extensions, whereby supplementary rings having a diameter and width exceeding that of the spider ring may be placed around the spider ring and actuated by said power means to compress and release a tire bead of larger diameter.

PIETRO J. CHRISTOFOLI.
WILBURN O. BENNETT.

REFERENCES CITED

The following references are of record in the file of this patent:

UNITED STATES PATENTS

| Number | Name | Date |
| --- | --- | --- |
| 1,564,496 | Staugaard | Dec. 8, 1925 |
| 1,724,813 | Weaver et al. | Aug. 13, 1929 |
| 2,043,169 | Hawkinson | June 2, 1936 |
| 2,373,975 | Plumeau et al. | Apr. 17, 1945 |
| 2,401,118 | Talley et al. | May 28, 1946 |
| 2,418,849 | Polt | Apr. 15, 1947 |
| 2,469,723 | Greene | May 10, 1949 |